(No Model.)

W. H. KERR.
BAG MAKING MACHINE.

8 Sheets—Sheet 3.

No. 445,351.  Patented Jan. 27, 1891.

Attest:
Sidney P. Hollingsworth
James T. Duhamel

Inventor:
William H. Kerr,
by Dodge Sons
Attys.

(No Model.) 8 Sheets—Sheet 4.
W. H. KERR.
BAG MAKING MACHINE.

No. 445,351. Patented Jan. 27, 1891.

(No Model.) 8 Sheets—Sheet 5.

W. H. KERR.
BAG MAKING MACHINE.

No. 445,351. Patented Jan. 27, 1891.

Attest:
Sidney P. Hollingsworth
James F. Duhamel

Inventor:
William H. Kerr,
by Dodge Sons,
Attys.

(No Model.) 8 Sheets—Sheet 6.
W. H. KERR.
BAG MAKING MACHINE.

No. 445,351. Patented Jan. 27, 1891.

pusher cam.

cutter cam.

Attest:
Sidney P. Hollingsworth
James T. Duhamel

Inventor:
William H. Kerr,
by Dodge & Sons,
Attys.

(No Model.)  8 Sheets—Sheet 7.

W. H. KERR.
BAG MAKING MACHINE.

No. 445,351.  Patented Jan. 27, 1891.

Attest:
Sidney P. Hollingsworth
James F. Duhamel

Inventor:
William H. Kerr,
by Dodge & Son,
Attys.

(No Model.) 8 Sheets—Sheet 8.
W. H. KERR.
BAG MAKING MACHINE.
No. 445,351. Patented Jan. 27, 1891.
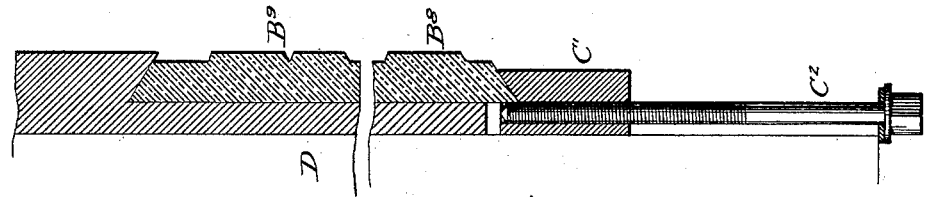
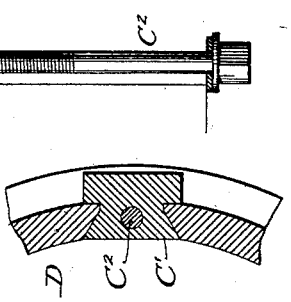
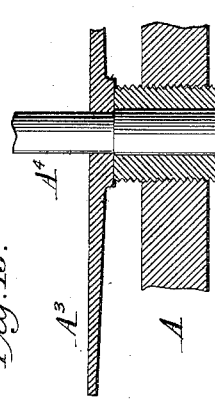
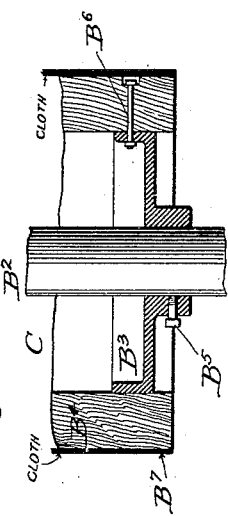
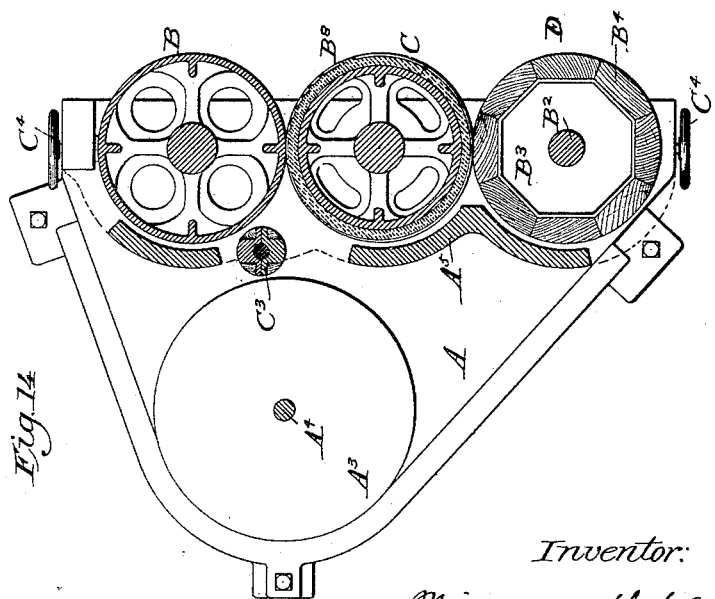
Attest:
Sidney P. Hollingsworth
James F. Duhamel
Inventor:
William H. Kerr,
by Dodge Sons,
Attys.

UNITED STATES PATENT OFFICE.

WILLIAM HALL KERR, OF DURHAM, ASSIGNOR, BY DIRECT AND MESNE ASSIGNMENTS, TO THE KERR BAG MANUFACTURING COMPANY, OF CONCORD, NORTH CAROLINA.

BAG-MAKING MACHINE.

SPECIFICATION forming part of Letters Patent No. 445,351, dated January 27, 1891.

Application filed June 28, 1889. Serial No. 315,920. (No model.)

*To all whom it may concern:*

Be it known that I, WILLIAM HALL KERR, a citizen of the United States, residing at Durham, in the county of Durham and State of North Carolina, have invented certain new and useful Improvements in Bag-Machines, of which the following is a specification.

My invention relates to bag-machines, and is designed more particularly for carrying out the method of making bags described in my application Serial No. 307,350, although various features of the invention are susceptible of use upon machines not carrying out said method.

Figure 1:
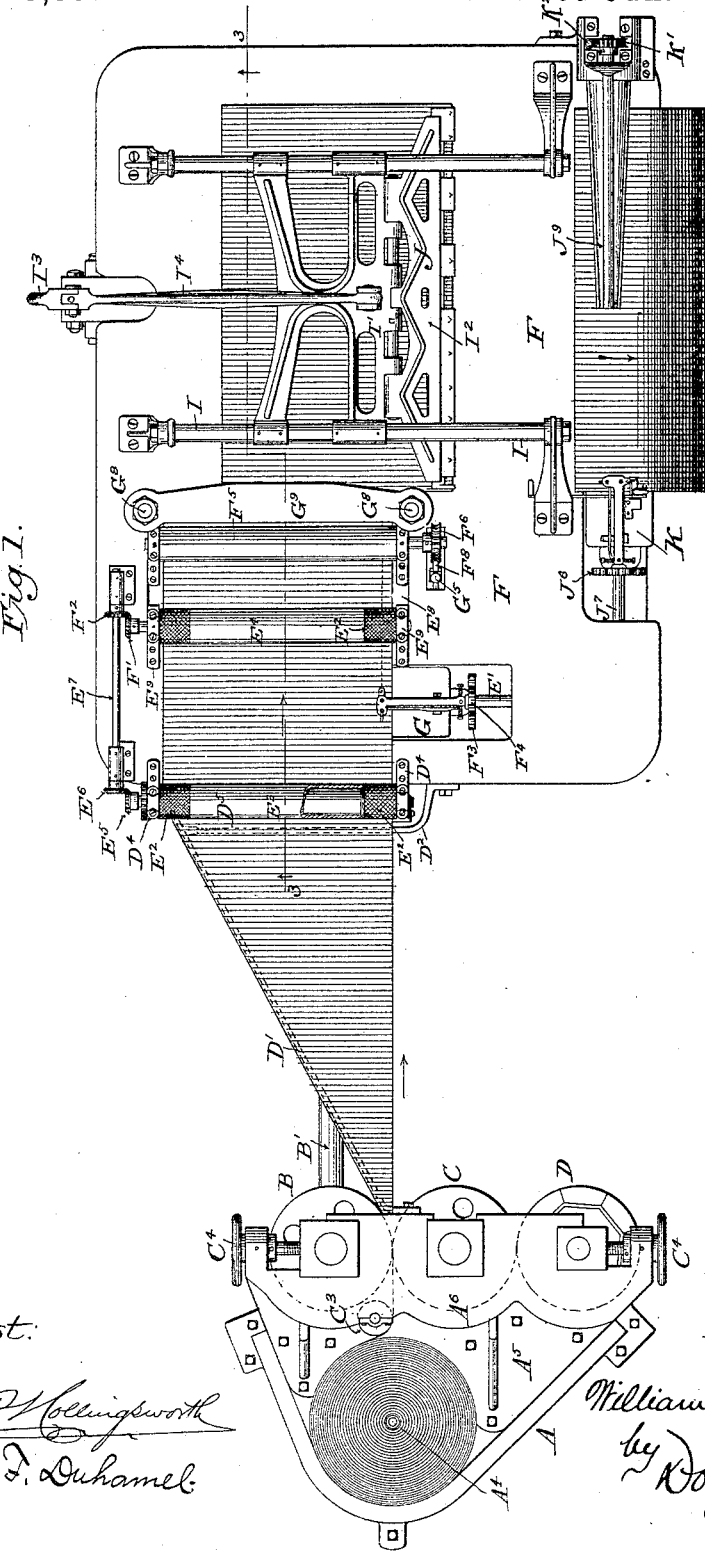
Figure 2:
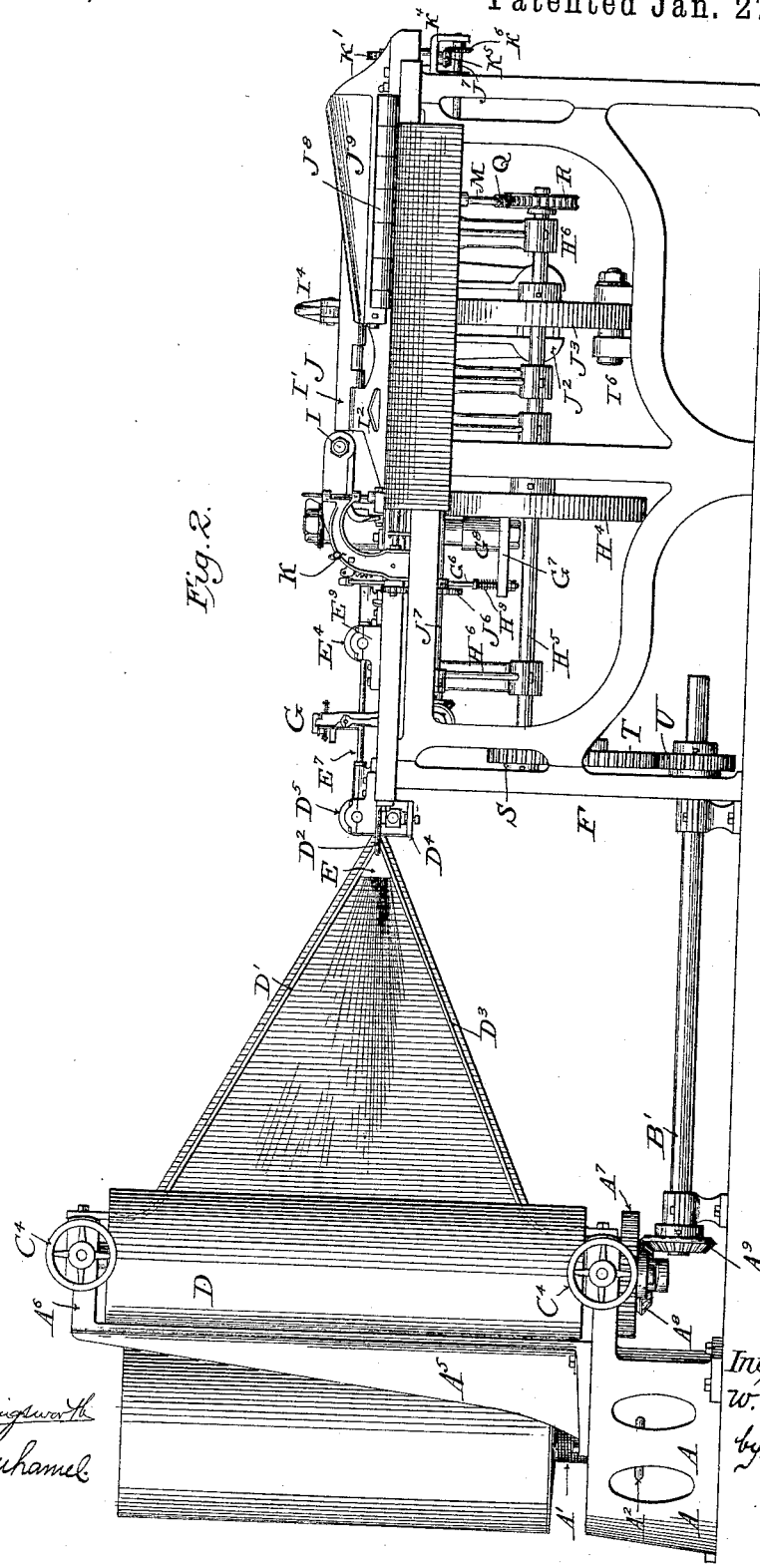
Figure 3:
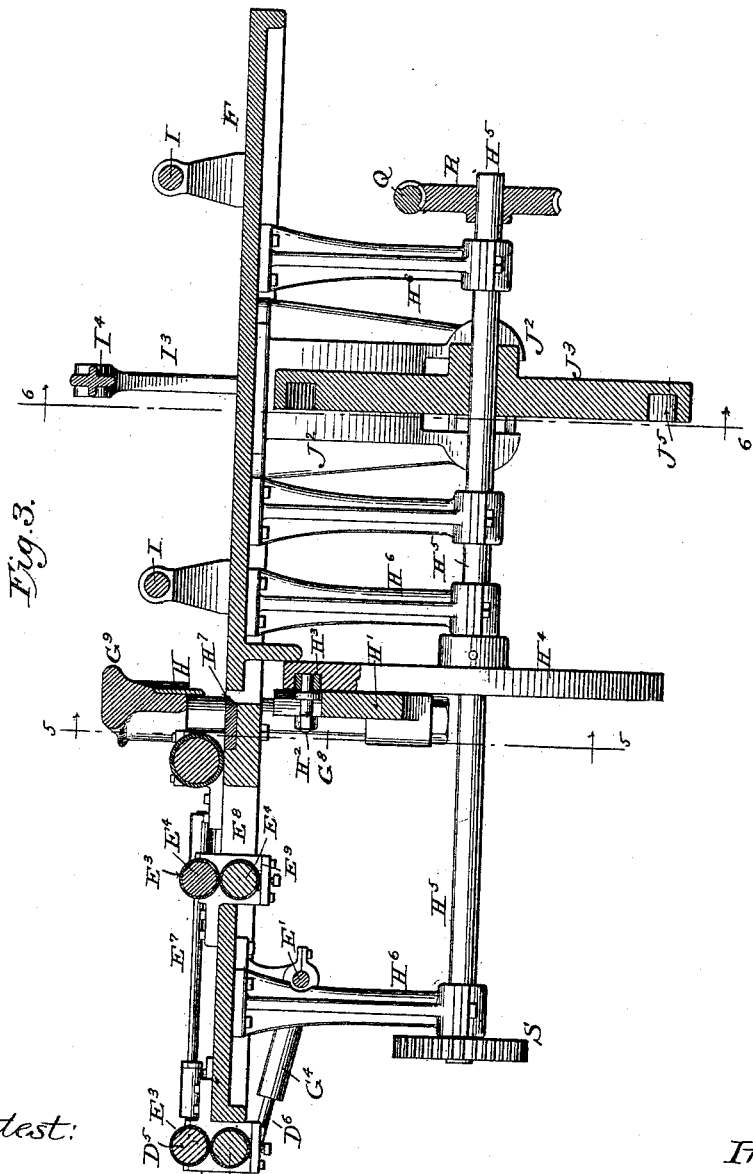
Figure 4:
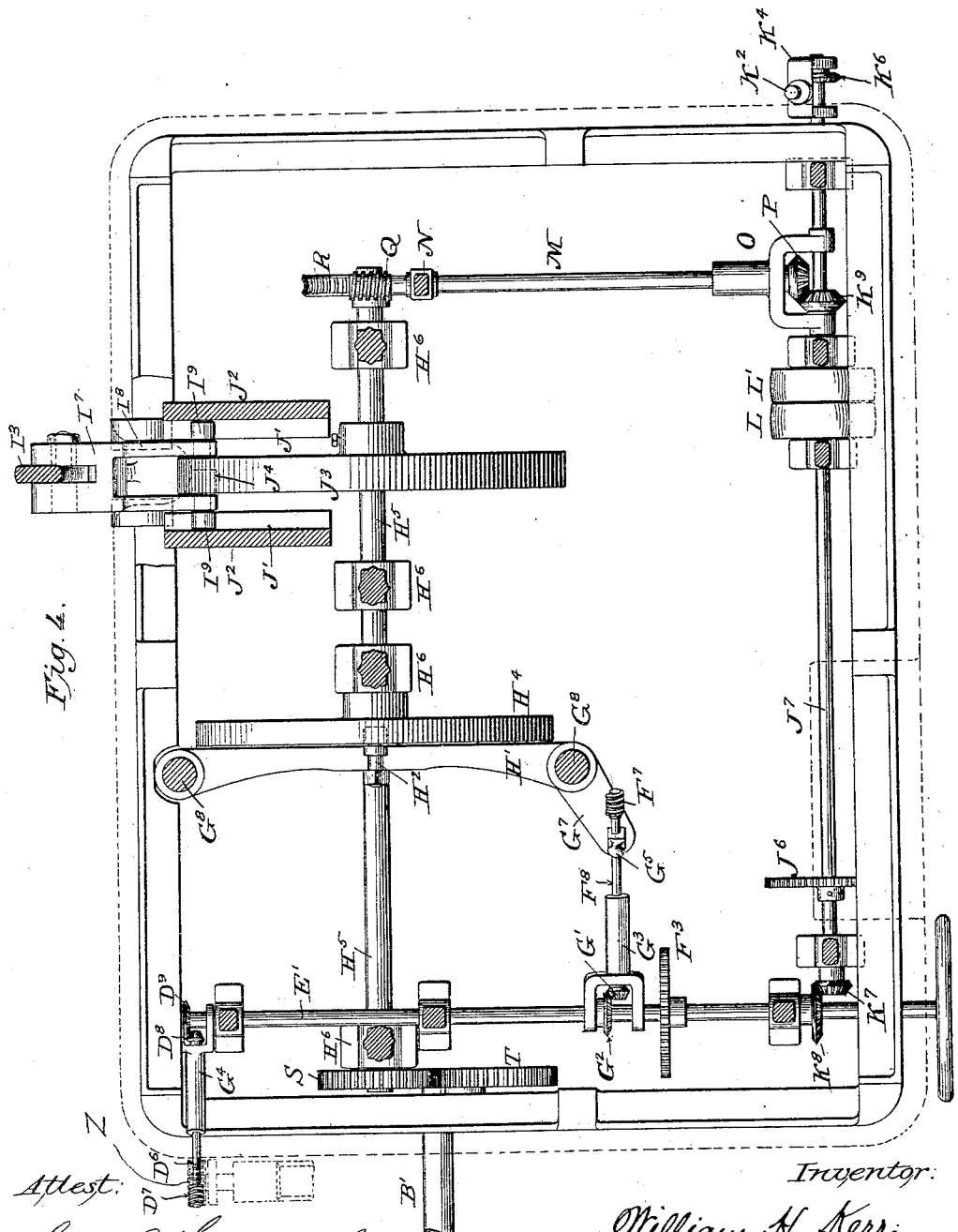
Figure 5:
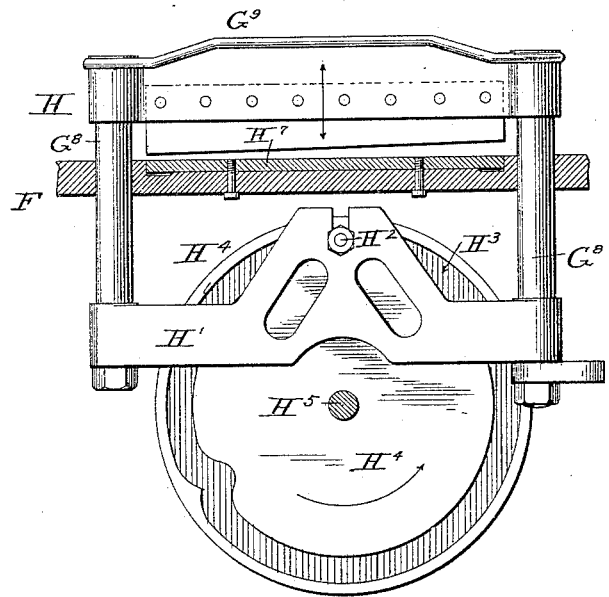
Figure 6:
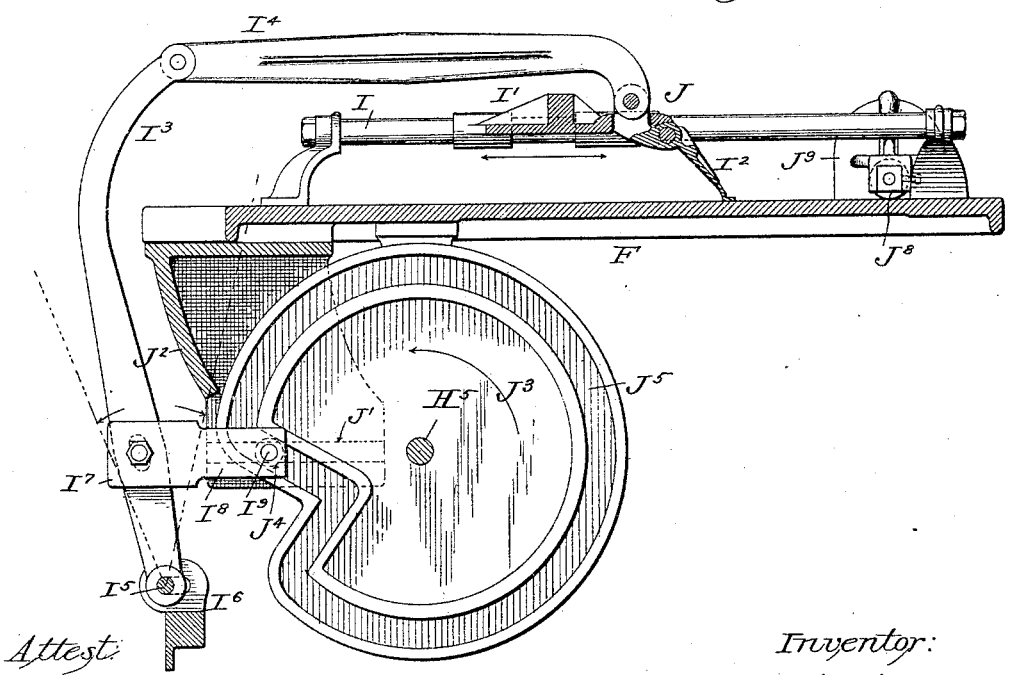
Figure 7:
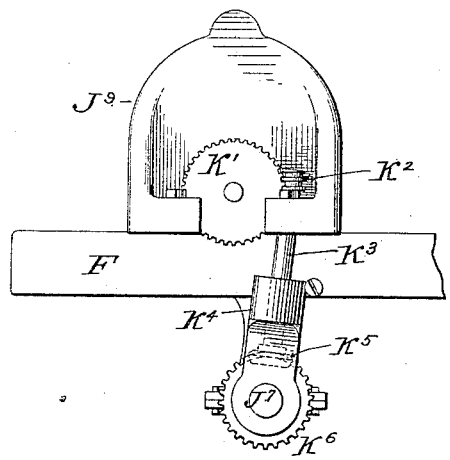
Figure 9:
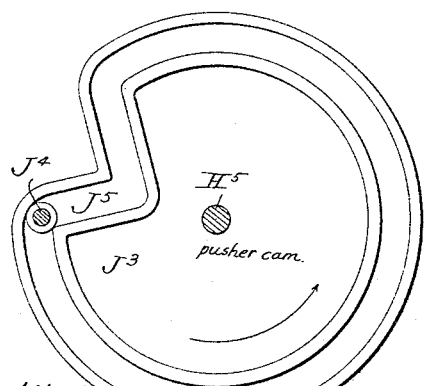
Figure 10:
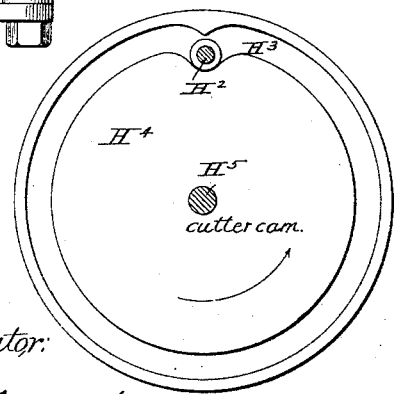
Figure 11:
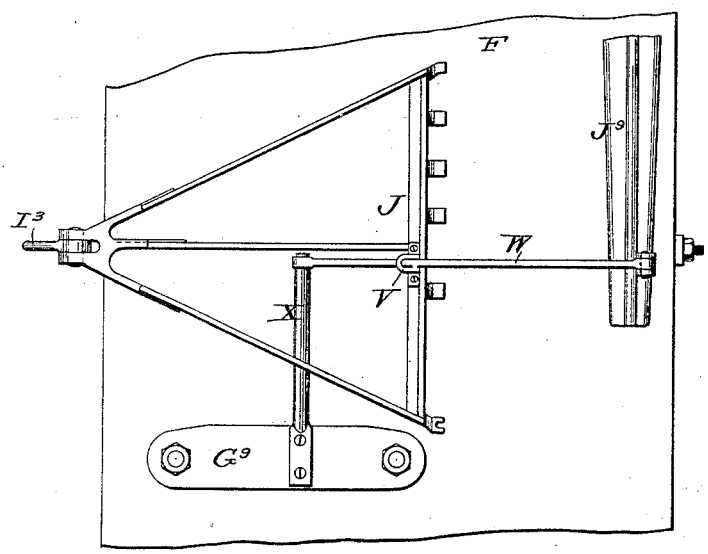
Figure 12:
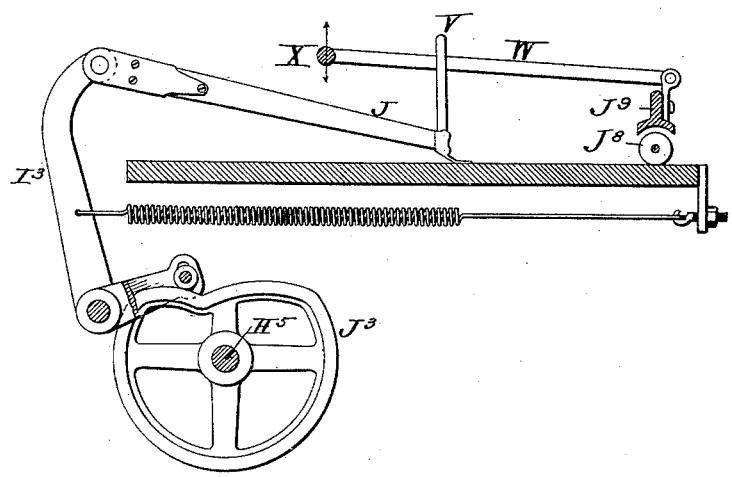
Figure 13:
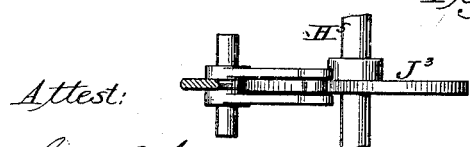

In the drawings, Figure 1 is a top plan view of my improved machine; Fig. 2, a side view of the same; Fig. 3, a longitudinal vertical sectional view taken on the line 3 3 of Fig. 1; Fig. 4, a plan view with the top plate removed, showing the mechanism for imparting motion to the several mechanisms; Figs. 5 and 6, sectional views on the lines 5 5 and 6 6, respectively, of Fig. 3; Figs. 7, 8, 9, and 10, views illustrating certain details hereinafter referred to; Figs. 11, 12, and 13, views illustrating a certain modification, and Figs. 14, 15, 16, 17, and 18 detail views illustrating the construction of the printing-cylinder.

In the preferred construction and arrangement the bag material passes in contact with an upright rotary cylinder and receives the desired imprint, which will usually be in two or more colors. Passing from the printing mechanism the material, which is in the form of a web or strip, is received upon a folder, which folds the material lengthwise through the middle and delivers it to a pair of feeding-rollers mounted upon a bed or framework. From the receiving-rollers the edges of the folded material pass to a stitching mechanism, which makes a continuous tube out of the material, suitable rollers being employed to cause the proper feed of the cloth. The tube thus made passes beneath a reciprocating cutter, which is so timed relatively to the sewing and feeding mechanism as to come into action only after a sufficient length of the cloth tube has passed to form a complete bag. After the knife ascends a pusher takes hold of the severed portion and carries it across the bed or table at right angles to the direction it previously traveled, the pusher being so arranged as to carry the severed tube to a second stitching mechanism adapted to sew the tube along the severed edge.

The foregoing statement is designed merely for the purpose of explaining in a general way the process here involved, and is not to be understood as in any way limiting the scope of the invention.

Referring again to the drawings, A is a base or frame, through the bottom of which passes a large screw $A'$, Figs. 2 and 15, the said screw being provided with a hand-wheel $A^2$, by which it may be readily turned. Resting upon the top of the screw is a plate $A^3$, which is perforated centrally to receive the stem or spindle $A^4$, entering also into a socket in the end of the screw. The bag material as it comes from the loom is wound upon the spindle and the latter inserted into the socket made to receive it.

Bolted to the upper face of the base A is an upright plate $A^5$, having an overhanging flange $A^6$ at its upper end, slotted to receive the bearings of three upright cylinders B, C, and D, as shown in Figs. 1, 2, and 14, the cylinders being supported at their lower ends by a forwardly-projecting flange with meshing gears $A^7$. One of these cylinders is also provided with a bevel-gear $A^8$, to which motion is imparted by a similar gear $A^9$ on the shaft $B'$, as shown in Fig. 2.

Cylinder B is a smooth-faced metal cylinder, while the cylinders C and D serve, respectively, to print and to ink. The cylinder D is composed of a shaft $B^2$, heads $B^3$, and blocks or staves $B^4$, the heads being secured to the shaft by set-screws $B^5$, and the staves to the heads by bolts $B^6$, as shown in Figs. 1, 14, and 16. The staves are turned so as to form a true cylinder, and are covered or wrapped with felt or similar ink-holding material $B^7$. The printing-surface $B^8$, I prefer to make in the form of vulcanized rubber plates $B^9$, which have their upper and lower edges beveled, as shown in Fig. 18, to engage with a similarly-beveled wall of a depression formed in the body of the cylinder C. In order to clamp the plates B⁸ in position, I employ blocks C', dovetailed into and sliding in grooves extending longitudinally of the cylinder, the blocks being adjusted and held in their adjusted positions by means of screws C², swiveled in the cylinder and screwing into the blocks, as shown in Figs. 17 and 18. These screws may be placed either at the upper or the lower end of the cylinder, as preferred.

In order to guide or direct the material properly between the printing-cylinder and the impression-cylinder, I mount upon the base A an upright roller C³, Figs. 1 and 14, and to secure a uniform impression and an equal distribution of the ink I provide adjusting-screws C⁴, Figs. 1, 2, and 14, by means of which the cylinders B and D may be moved toward and from the cylinder C at either or both ends.

As the bag material unwinds from the spindle it passes in contact with the roller C³ and then between the cylinders B C, which, rotating toward each other, feed the material along at the same time that they print upon it. After leaving the cylinders the cloth is folded lengthwise through the middle by means of a folder E, bolted at one end to the frame A of the printing mechanism and at the other end to the bed or table F of the sewing and cutting mechanism, which is about one-half as high as the frame A. One arm D' of the folder is bolted to the flange A⁶ and extends downward diagonally to the table F or to an arm D² secured thereto, while the other arm D³ extends upward from the overhanging flange of base A upward to and connects with the arm D², as shown in Figs. 1 and 2. This folder E causes the material to double or fold lengthwise, and is so arranged relatively to the printing-cylinder and table F that the edges of the material lying upon the table shall be in line with the printing-cylinder, thereby avoiding any twisting of the material such as would interfere with an even and easy feeding of the same.

Mounted in brackets or hangers D⁴, projecting from the receiving end of the bed or table F, is a pair of rollers D⁵, between which the folded cloth passes, motion being imparted to the lowermost roller by means of a shaft D⁶, carrying at one end a worm D⁷ to engage a worm-wheel Z, Fig. 4, and at the other end a bevel-gear D⁸, engaging with a similar gear D⁹ on a cross-shaft E'. These rollers are enlarged at their ends, as at E², and are covered throughout the greater part of their length by a wrapping E³, of rubber or felt, the enlarged ends E² being knurled or roughed in order that they may take a firm hold upon the bag material.

It will be noticed that the folding is done in such manner as to bring the fresh-printed surface on the inside of the tube, and if the rollers D⁵ were made to bear with force upon the cloth throughout their length they would cause the printing to transfer. It is to prevent this that the rollers are made to press upon the cloth only at the edges of the tube, the intermediate portions of the rollers serving merely to keep the material flat and smooth. The upper roller D⁵ is turned by friction only, and its shaft is provided with a bevel gear-wheel E⁵ to mesh with a similar gear E⁶, carried by a shaft E⁷, journaled on the upper side of the table F, as shown in Figs. 1, 2, and 3.

The bed or table F is slotted, as at E⁸, Fig. 3, and projecting downward into this slot are double boxes or bearings E⁹, which receive a second pair of feed-rollers E⁴, similar in all respects to the feed-rollers D⁵, the shaft of the upper roller being provided with a bevel-gear F' to mesh with a similar gear F² on the shaft E⁷, as shown in Fig. 1. Between the rollers E⁴ and D⁵ is a stitching mechanism G of any desired construction, motion being imparted to the said sewing mechanism from the shaft E' by means of gears F³ and F⁴, Figs. 1 and 4, secured, respectively, to the shaft E' and the shaft of the machine. As the folded material passes from one set of rollers D⁵ to the other set E⁴ its edges are stitched by the sewing or stitching mechanism G and the material thereby formed into a tube.

Figure 8:
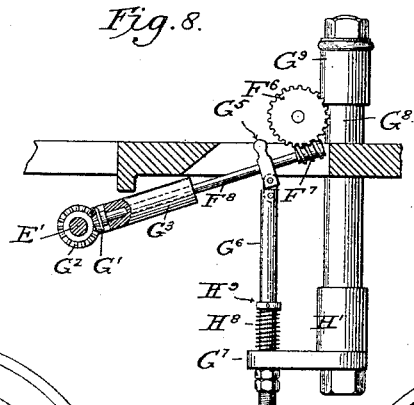

H indicates a vertically-reciprocating cutter or knife, which extends transversely across the tube and severs the same into lengths of predetermined size. The feed of the material by the rollers D⁵ E⁴ continues during the cutting operation, and the material has a tendency to bank up; but this is compensated for by providing the table with the recess E⁸, Fig. 3, before referred to, the material dropping down into the recess or depression during the short interval of time occupied in cutting. Immediately in front of and parallel with the knife or cutter is a rubber-covered roller F⁵, journaled in bearings on the table and provided at one end with a worm-wheel F⁶, receiving motion from a worm F⁷, which is carried at the upper end of a shaft F⁸, projecting up through a slot in the table, as shown in Figs. 1, 4, and 8. Shaft F⁸ is provided with a bevel-gear G' to mesh with a similar gear G² on the shaft E' and passes freely through a yoke G³, hung or pivoted on the shaft E', as shown in Figs. 4 and 8. The shaft D⁶, hereinbefore referred to, is supported by a similar yoke G⁴, Fig. 4. Mounted upon the shaft F⁸ is a block or thumb piece G⁵, pivotally connected to the upper end of a rod G⁶, which latter is carried by an arm G⁷, projecting from one of the upright guide-rods G⁸ of the cutter-frame, as shown in Figs. 4 and 8. This cutter-frame comprises two upright cylindrical guide-rods G⁸ G⁸, connected at their upper ends by a cross-head G⁹ and at their lower ends by a cross-head H', the latter cross-head carrying a pin or stud H² to work in the groove or way H³ of a cam or eccentric H⁴, as shown in Figs. 3, 4, and 5. This cam is mounted upon and rotates with a shaft H⁵, journaled in brackets or hangers H⁶, secured to the under side of the bed or table F, as shown in Figs. 2, 3, and 4.

The cutting-blade H acts in conjunction with a fixed blade H⁷, secured to the table, and has its edge inclined, so as to produce a shearing action, as will be readily understood.

A coiled spring H⁸ encircles the lower end of the rod G⁶ and bears at opposite ends against the arm G⁷ and a shoulder or nut H⁹ upon the rod, the spring serving to hold the worm F⁷ up into engagement with the worm-wheel F⁶ on the shaft of roller F⁵. Of course if the roller F⁵ continues to rotate during the cutting operation it causes the material to bank up, as before stated, and to avoid this I provide the construction shown in Fig. 8, by means of which the shaft-worm F⁷ is carried out of engagement with worm-wheel F⁶ at each descent of the cutter, as will be readily understood.

During the cutting operation the roller remains stationary and prevents the feed of the material; but as soon as the knife rises the arm G⁷ carries the worm up into engagement with the worm-wheel. While the roller F⁵ remains at rest the rollers D⁵ and E⁴ and the sewing mechanism G continue in operation, and the material that is sewed drops down into the recess E⁸, as before stated.

Instead of automatically disengaging the gearing of roller F⁵, it may be accomplished by hand by merely pressing down upon the thump-piece G⁵ and overcoming the force of spring H⁸.

Mounted upon the bed or table, but raised a distance from the face thereof, are two parallel guide-rods I I, which extend at right angles to the line of movement of the tube being cut, the said rods being adapted to receive a sliding pusher J of the form represented in Figs. 1 and 6. This pusher at certain predetermined intervals takes the severed bag-section and moves it at right angles to the line of travel of the tube before it is cut, and upon reference to the drawings it will be noticed that the pusher is about as wide as the severed bag-section is long. The pusher J comprises a cross-bar or frame I', fitting and free to slide back and forth upon the rods I and plate I², hinged or pivoted to the cross-bar or frame, as shown in Figs. 1, 2, and 6, and adapted to bear at its lower edge upon the bag material. The lower face of the pusher-plate I² may be roughened, in order to take a firm hold upon the cloth, and may have either a continuous bearing-edge or a notched edge, as preferred.

In order to cause the proper reciprocation of the pusher, I employ an upright lever I³, connected at its upper end by means of a link I⁴ with the pusher-plate I², as shown in Fig. 6. This lever I³ is pivoted at its lower end upon a pin or bolt I⁵, seated in a slotted lug I⁶ of the table F, as shown in Fig. 6, to provide for adjustment, and is provided with a bifurcated block I⁷, to which it is pivotally connected. The arms I⁸ of block I⁷ are provided on their outer faces each with a stud I⁹, adapted to work back and forth in grooves J' on the inner faces of a bifurcated bracket J², secured to the under side of table F, as shown in Fig. 4, so as to steady and guide the block in its movements. Block I⁷ also embraces a cam J³, fast upon shaft H⁵, and is provided with a stud J⁴ to engage the cam-groove J⁵, as shown in Figs. 4 and 6. Now as the cam J³ rotates, acting through the block I⁷, it causes the lever I³ to swing back and forth upon the pivot I⁵ and carry with it the pusher; but, owing to the fact that the link I⁴ is connected to the plate I² above the pivot of the latter, the said plate will be rocked on its pivot slightly and raised off the cloth preparatory to moving backward. In moving forward the initial movement of the link and lever will rock the plate I² and cause its lower edge to bear upon the cloth preparatory to feeding the latter to the second sewing mechanism on the completion of the movements of the lever.

The cams operating the cutter and the pusher are so timed that just the instant that the cutter severs the projecting end of the tube the pusher will take hold of the severed section and carry it out of the way and into position to be stitched along the end. The relative positions of the cams are illustrated in Figs. 9 and 10. The pusher-plate I² carries the severed bag-section to a second stitching or sewing mechanism, which receives motion from a gear-wheel J⁶, secured to the main driving-shaft J⁷, the said stitching mechanism being adapted to sew the bag-tube transversely or across the end, as shown in Fig. 1.

In order to steady and guide the bag as it is being sewed, I mount a roller J⁸ in an overhanging arm or bracket J⁹, secured to the top of plate F, as shown in Figs. 1 and 2, the roller being arranged advisably directly opposite the sewing mechanism K. On the end of shaft of roller J⁸ is worm-wheel K', to which motion is imparted by a worm K², the said worm being carried at the upper end of a shaft K³. This shaft is supported by a yoke K⁴, journaled upon the main driving-shaft J⁷, and is provided with a bevel-gear K⁵ to mesh with a similar gear K⁶ on shaft J⁷, Figs. 1, 2, 4, and 7. The main shaft J⁷ is provided with a bevel gear-wheel K⁷ to engage a similar gear K⁸ on shaft E', as shown in Figs. 2 and 4, and is also provided with a bevel-gear K⁹ and fast and loose pulleys L and L'.

M indicates a shaft supported at one end by a bracket or hanger N, secured to the under side of table F, Fig. 4, and supported at the opposite end by a yoke O, hung upon the main driving-shaft. The shaft M is provided at one end with a bevel-gear P to engage the gear K⁹ and at the other end with a worm Q to engage a worm-wheel R, secured to shaft H⁵. At the opposite end of shaft H⁵ is a gear-wheel S, which engages with an idler T, engaging with a gear U on shaft B', as shown in Figs. 2, 3, and 4.

In Figs. 11, 12, and 13 is shown a modification of the pushing mechanism or that mechanism which feeds the severed bag-section to the second stitching mechanism. The shaft $H^5$ is provided with a cam $J^3$, which serves to actuate a pivoted lever $I^3$, which carries at its upper end the pusher J, the said pusher being provided with an upwardly-extending loop V, made to receive a rod W, which latter is secured at one end to the bracket $J^9$ and at the other end to an arm X, projecting from the upper cross-head $G^9$ of the cutter. A coiled spring Y, secured to the bed or table and to the lever acting in conjunction with the cam, causes the proper throw of the lever. Now just the instant the cutter begins to rise it will elevate the rod W, so that when the pusher is drawn back preparatory to taking hold of a new severed section its loop, riding up the rod, will raise the lower edge off the table, so as not to interfere with the feed of the tube. When the cutter descends, it allows the pusher to rest upon the cloth.

Under either of the arrangements shown the purpose of the pusher is merely to start the severed bag-section under the roller $J^8$, the said roller and the stitching mechanism causing the further proper travel.

The construction of the folder $D'$ $D^3$ is not specifically claimed herein, being set forth and claimed in another application, Serial No. 338,718.

I do not broadly claim in this application the combination of a folding device adapted to fold the strip longitudinally and to place its inner faces in opposition throughout, a holder adapted to hold the edges of the folded strip in alignment, and a sewing mechanism adapted to stitch the opposing edges together, and thereby form a seam which, when the bag is turned, shall have its edges within the bag, as this is embraced in my application, Serial No. 338,718, before referred to.

Having thus described my invention, what I claim is—

1. In an organized machine for the manufacture of cloth bags from a continuous strip of cloth, the combination, with a printing mechanism, of a folder constructed and arranged, substantially as shown and described, to take the printed strip and lay its longitudinal edges one upon the other, a sewing mechanism adapted to unite the edges of the folded strip, a cutter for severing the tube thus formed, and a second sewing mechanism for uniting one end of the severed section, said mechanisms being combined and arranged for operation substantially as shown and described.

2. In an organized machine for the manufacture of bags from a continuous strip of cloth, the combination, with a horizontal bed or table, of a sewing mechanism or mechanisms mounted thereon, an upright cloth-carrier, a printing mechanism adapted to act upon the material as it unwinds from the carrier, and a folder arranged, substantially as shown and described, to take the strip of material as it comes from the printing mechanism and deliver it with its edges folded one upon the other in position to be acted upon by the sewing mechanism.

3. In an organized machine for the manufacture of bags from a continuous strip of cloth, the combination, with a printing mechanism, of a folder adapted to fold the printed strip through the middle with the printed face inside and with the edges of said face lying one upon the other, and a sewing mechanism or mechanisms for uniting the edges of the folded strip, all combined and arranged to operate substantially in the manner shown.

4. In a machine for the manufacture of bags from a continuous strip of cloth, the combination of the following instrumentalities, to wit: a printing mechanism arranged to print upon the continuous strip of cloth, a folding device adapted to receive and to fold the printed strip longitudinally through the middle, a cutter, and a bag-sewing mechanism or mechanisms to receive the folded material and sew it into proper form for use as bags, the folding device being located between the fabric-supply and the cutter, and the parts being arranged to operate substantially in the manner set forth.

5. In a bag-machine, the combination, with the printing and sewing mechanisms, of a base A, a socketed screw $A'$, a plate or disk $A^3$, and a stem or spindle $A^4$, passing through the plate and into the screw.

6. In a bag-machine, the combination, with a printing mechanism, of a stitching mechanism, a folder adapted to fold the bag material lengthwise through the middle with the printed face inside, and a feed-roller reduced in diameter between its ends and adapted to bear upon the cloth only at one or both ends.

7. In a bag-machine, the combination, with the table F and a sewing mechanism, of a printing mechanism, the feed-roller $D^5$, having enlarged ends $E^2$, and a covering applied to the reduced portion of the roller.

8. In a bag-machine, the combination, with the table F, of a sewing mechanism, feed-rollers $D^5$ $D^5$, journaled in bearings on the table, worm-wheel Z, secured to one of said rollers, a shaft $E'$, provided with a gear-wheel $D^9$, and a shaft $D^6$, provided at opposite ends with a gear $D^8$ and a worm $D^7$, said shaft $D^6$ being hung upon the shaft $E'$, substantially as shown.

9. In a bag-machine, the combination, with the printing mechanism, of a folder adapted to fold the material lengthwise through the middle with the printed face inside, two feed-rolls $D^5$ and $E^4$, adapted to bear only at their ends upon the folded bag material, and a stitching mechanism interposed between the feed-rolls.

10. In a bag-machine, the combination, with a table having an opening or recess, as $E^8$, of a stitching mechanism, and a continuously-rotating feed-roll on one side of said opening, and an intermittently-acting feed-roll and an intermittently-acting cutter on the other side of said opening.

11. In a bag-machine, the combination, with the table F, having an opening or recess, as E³, of the feed-rollers D⁵ and E⁴, the interposed stitching mechanism G, located in advance of the opening, an intermittently-acting cutter in rear of the opening, and an intermittently-acting feed-roller F⁵, also located in rear of the opening, but in advance of the cutter.

12. In a bag-machine, the combination, with a suitable sewing mechanism, of a cutter, a feed-roller, and intermediate connections, substantially such as shown, whereby the roller is adapted to be thrown out of action by the cutter.

13. In a bag-machine, the combination, with a suitable sewing mechanism, of a cutter, a feed-roller, gearing for imparting motion to the feed-roller, and an arm carried by the cutter-frame and connected with the gearing, whereby when the cutter descends the gearing will be thrown out of action and when the cutter ascends it will be thrown into action.

14. In a bag-machine, the combination, with a suitable sewing mechanism, of a cutter, a feed-roller provided with operating mechanism adapted to be automatically thrown into and out of operation by the movements of the cutter, and means, substantially such as shown, for throwing said operating mechanism out of operation manually without stopping the action of other parts of the machine.

15. In combination with the reciprocating cutter-frame provided with an arm G⁷, a feed-roll provided with a worm-wheel F⁶, a shaft F⁸, provided with a yoke G³, gear G', and a worm F⁷, a rod G⁶, connected with the shaft F⁸ and arm G⁷, and a shaft E', provided with a gear G².

16. In combination with the reciprocating cutter-frame having an arm G⁷, a feed-roll F⁵, provided with a worm-wheel F⁶, a shaft E', provided with a gear-wheel G², a second shaft F⁸, hung upon the shaft E' and provided with worm F⁷ and gear-wheel G', a block G⁵, through which shaft F⁸ passes, a rod G⁶, passing through the arm G⁷ and connected with block G⁵, and a spring H⁸, arranged for operation substantially as shown.

17. In a bag-machine, the combination, with a sewing mechanism and suitable feed-rollers, of a cutter adapted to sever the material into bag-lengths, a second sewing mechanism arranged out of line with the first and adapted to sew the end of the severed length, a horizontally-moving pusher adapted to carry the severed section from the cutter to the second sewing mechanism, and means for imparting motion to the various parts.

18. In a bag-machine, the combination, with a sewing mechanism, of a cutter adapted to sever the material transversely as it comes from the sewing mechanism, a pusher movable horizontally at approximately right angles to the line of feed of the sewing mechanism, substantially as shown, a second sewing mechanism adapted to receive and sew the severed section, and means for imparting motion to the various parts.

19. In a bag-machine, the combination, with two sewing mechanisms operating substantially at right angles to each other, of a cutter and a horizontally-moving pusher interposed between the sewing mechanisms, all substantially as shown.

20. In a bag-machine, the combination, with two sewing mechanisms operating continuously, of an intermittently-acting cutter and an intermittently-acting pusher interposed between the sewing mechanisms to carry the severed section horizontally from one sewing mechanism to the other, and means for imparting motion to the various parts, all substantially as shown.

21. In a bag-machine in which the bags are made from a continuous strip of cloth folded longitudinally through the middle, the combination of the following elements, to wit: first, a sewing mechanism adapted to sew the folded strip along its edge; second, a cutter adapted to sever transversely the tube thus formed; third, a horizontally-moving pusher adapted to move the severed section approximately at right angles to the line of movement of the cloth tube, and, fourth, a second sewing mechanism adapted to sew the severed bag-section across its end, the said elements being timed to operate substantially in the order set forth.

22. In a bag-machine, the combination, with a sewing mechanism G, of a cutter H, adapted to cut the material into lengths suitable for the formation of a bag as it comes from the said sewing mechanism, a cam or eccentric for operating the cutter, a laterally-moving pusher J, adapted to take hold of the severed section and move it sidewise in the plane in which it passes beneath the cutter, a second sewing mechanism K, arranged to sew one edge of the severed bag-section, and a cam or eccentric for operating the pusher, the cutter and pusher-cams being so arranged that as soon as the cutter descends and severs the tube of cloth the pusher will be brought into action to remove the severed section.

23. In a bag-machine, the combination, with two sewing mechanisms, of a vertically-reciprocating cutter and a horizontally-moving pusher interposed between the two mechanisms.

24. In combination with a bed or table and the elevated guides or supports I, a pusher J, mounted thereon, a pivoted lever I³, a link connecting the lever and pusher, a driving-shaft, and a cam thereon for actuating the lever.

25. In combination with guides or supports I I, a pusher J, comprising frame or cross-head I' and pivoted plate I², a lever I³, a link connecting the lever with the plate above the pivot of the latter, and a cam or eccentric for moving the lever.

26. In combination with table F, having grooved bracket $J^2$, shaft $H^5$, provided with cam $J^3$, a pivoted lever $I^3$ and pusher J, and a block $I^7$, carried by the lever and engaging the bracket and cam.

27. In combination with table F, bracket $J^2$, having the separated arms grooved as at $J'$, shaft $H^5$, provided with a cam $J^3$ to run between the arms of the bracket, a pivoted lever $I^3$ and pusher J, and a bifurcated block $I^7$, secured to the lever, the said block being provided with a stud $J^4$ to engage the cam and studs $I^9$ to engage the grooves $J'$ in the bracket.

28. In a bag-machine, the combination, with two sewing mechanisms and their feeding devices, of a pusher for carrying the material from one mechanism to the other, and means independent of the sewing mechanisms or their feeding devices for raising or elevating the pusher as it recedes.

29. In a bag-machine, the combination, with the table F, of a sewing mechanism K, an overhanging arm $J^9$, and a roller $J^8$, carried by said arm.

30. In a bag-machine, the combination, with arm or bracket $J^9$ and the roller $J^8$ carried thereby, of the worm-wheel $K'$, secured to the roller-shaft outside of the arm or bracket, a shaft $J^7$, provided with a bevel-gear $K^6$, a shaft $K^3$, provided at one end with a worm $K^2$ and at the other end with a bevel-gear $K^5$, and a yoke $K^4$, connecting the shafts $J^7$ and $K^3$.

31. In a bag-machine, the combination, with the roller $J^8$, of the reciprocating pusher J, adapted to carry the material under the roller, and a stitching mechanism arranged opposite the roller.

32. In a bag-machine, the combination, with sewing mechanisms G and K and suitable feed-rollers to act in conjunction therewith, of a reciprocating cutter, a horizontally-moving pusher to convey the bag material from one sewing mechanism to the other, a main driving-shaft, and gearing, substantially such as shown, for imparting motion to the several mechanisms from said driving-shaft.

In witness whereof I hereunto set my hand in the presence of two witnesses.

WILLIAM HALL KERR.

Witnesses:
 FRANK E. PAGE,
 L. F. ANDERSON.